March 5, 1935.  F. L. DARLING ET AL  1,993,650
CAPPING MACHINE
Filed Aug. 29, 1932   6 Sheets-Sheet 1

Fig. 1.

Inventors
Frank L. Darling
George J. Huntley
Attorneys

March 5, 1935.  F. L. DARLING ET AL  1,993,650
CAPPING MACHINE
Filed Aug. 29, 1932   6 Sheets-Sheet 2

Fig. 2.

Inventors
Frank L. Darling,
George J. Huntley.

March 5, 1935. F. L. DARLING ET AL 1,993,650
CAPPING MACHINE
Filed Aug. 29, 1932 6 Sheets-Sheet 4

Fig. 4.

Inventors
Frank L. Darling
George J. Huntley

March 5, 1935.  F. L. DARLING ET AL  1,993,650
CAPPING MACHINE
Filed Aug. 29, 1932  6 Sheets-Sheet 5

Inventors
Frank L. Darling
George J. Huntley

March 5, 1935.  F. L. DARLING ET AL  1,993,650
CAPPING MACHINE
Filed Aug. 29, 1932   6 Sheets-Sheet 6

Inventors
Frank L. Darling
George J. Huntley

Attorneys

Patented Mar. 5, 1935

1,993,650

UNITED STATES PATENT OFFICE 1,993,650

CAPPING MACHINE

Frank L. Darling and George J. Huntley, Baltimore, Md., assignors to Crown Cork & Seal Company, Inc., Baltimore, Md., a corporation of New York Application August 29, 1932, Serial No. 630,962

28 Claims. (Cl. 226—84)

The present invention relates to a capping machine for receptacles and, more particularly, to a capping machine of the small, readily movable type.

Capping machines of the smaller types now in use are not widely adjustable for operation upon receptacles of different sizes and configurations, nor do they usually include in their operating mechanism the principal safety devices incorporated in the larger machines. Machines which are not adjustable for use with receptacles and caps of wide size ranges have obvious commercial disadvantages and machines which do not include proper safety devices to prevent breakage of receptacles are also uneconomical in that they must generally be operated by an attendant who has had some degree of experience in handling such an apparatus and who will readily observe the possible occurrence of a misalignment of the capping head and receptacle. If the receptacle to be capped is not so presented to the capping head that it is exactly in alignment with the latter, the capping head will strike the upper edge of the mouth of the receptacle instead of moving downwardly about the mouth of the receptacle. If the capping head strikes against the edge of the mouth of the receptacle, the receptacle will either be broken or damaged or the cap blank will be distorted. Breakage of the filled receptacle retards the operation of the machine, since the contents of the receptacle will be spilled or discharged upon the work table of the machine. Such breakage also increases the cost of operation.

A number of safety devices have been used with the larger machines to insure that the receptacles are accurately fed to the capping head or to stop the operation of the machine in case the receptacles are not properly presented, but the design of these safety devices is such that they cannot practicably be used in smaller machines. Also, even in large machines, when these safety devices have been automatically caused to function by some improper feeding of the receptacles, the machine must be manually restored to operative condition.

The principal object of the present invention is to provide a capping machine which comprises a small, self-contained unit and in which all of the receptacle-handling elements are widely adjustable for operating upon receptacles of various sizes and configurations.

Another object of the invention is to provide a capping machine wherein the driving means is adapted to be released or rendered inoperative whenever a receptacle is improperly presented to any of the receptacle engaging parts of the machine.

Another important object is to provide a release mechanism in the driving means which will automatically be restored to a normal driving position when the overload condition has been corrected.

Still another object of the invention is to provide a capping machine which will automatically center receptacles with respect to the capping means and which may therefore be operated by an inexperienced attendant.

A further object is to provide a capping head which may be readily adjusted for operation with caps of various sizes.

Another object is to provide a capping machine having a capping mechanism and receptacle feeding mechanism which may be adjusted to operate upon receptacles of a wide range of sizes and configurations.

Other objects and advantages of the invention will be apparent from the following drawings, wherein like numbers indicate like parts throughout the several views.

The machine of our invention comprises a casing generally indicated by the numeral 10, at the upper end of which is provided a work table 11 which includes and surrounds a receptacle feeding platform 12 which is rotated by a shaft 13.

A spider 14 is secured to the feeding platform 12 and holds the receptacles during the turning movement of the platform so that they will be properly presented beneath a capping head 15 secured to a vertically reciprocating sleeve 16.

The casing 10 is preferably formed of sheet metal walls supported upon a frame of angle bars and includes front and rear walls 17 and 18, respectively, and side walls 19. The front and rear walls 17 and 18 are rigidly braced and secured together upon lower angle members 20 and upper angle members 21 connected by vertically extending angle members 22 at each corner of the casing 10. Horizontally extending angled members 23 are secured to the vertically extending members 22 at a point spaced above the lower members 20 and the intermediate members 23 support a plate 24 upon which the driving mechanism of the machine is supported. The side walls 19 are pivotally supported upon the rear vertically extending members 22 and form doors for the casing 10. A plate 25 is mounted upon the lower bracing members 20 and the space above this plate and beneath plate 24 thus serves as a cabinet or support for tools and the like. The rear wall 18 of the casing 10 is provided with a ventilating aperture indicated at 26. The casing 10 is preferably mounted upon casters 27 so that the machine may be readily moved from place to place.

Figure 2:
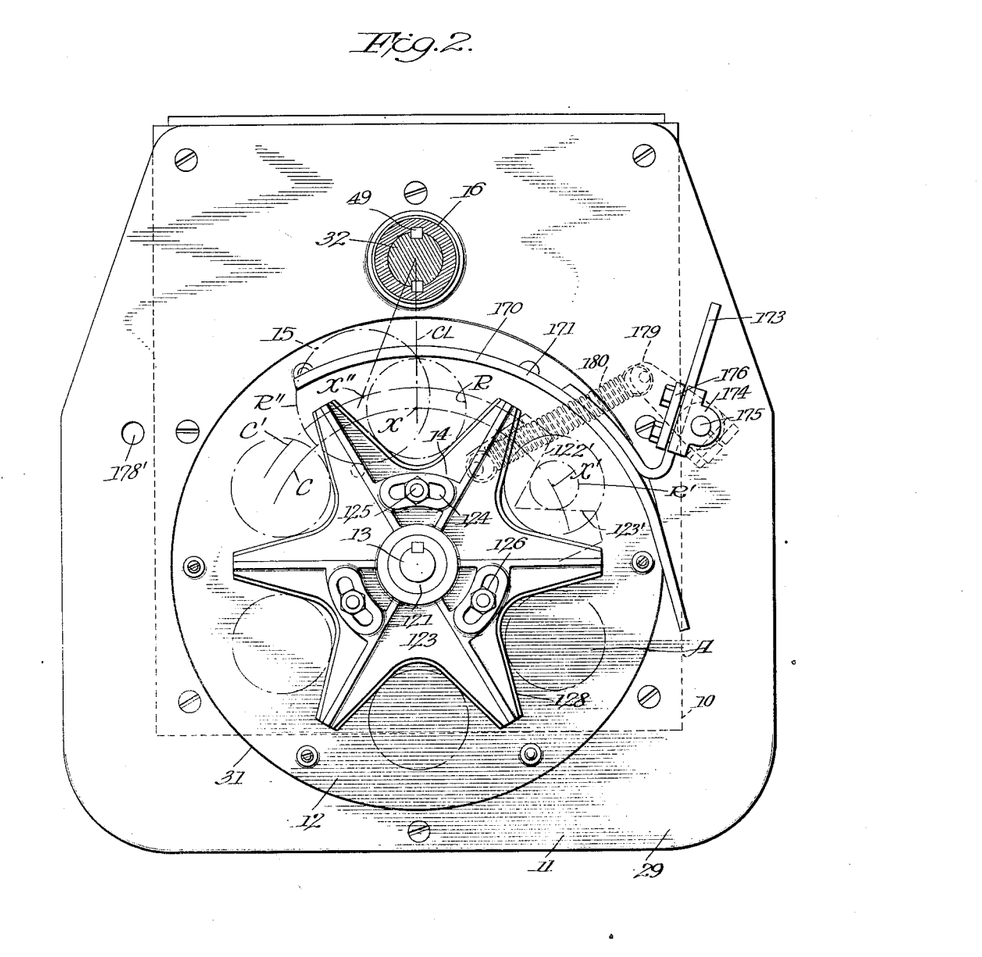
Figure 2 is a plan view of the work table of the machine, the capping head post being shown in section.

The upper end of the casing 10 is closed by a casting 28 bolted to the upper angle members 21 and the stationary portion 29 of the work table 11 is supported upon and spaced above the casting 28 by means of vertical posts 30. As is best shown in Figure 2, the stationary portion 29 of the work table 11 is substantially rectangular and is provided with a relatively large aperture 31 in which the rotatable feeding platform 12 is positioned, the upper surfaces of the stationary portion 29 and platform 12 being flush with each other.

The driving motor 32 of our machine is rigidly secured to a casting 33 which is bolted upon the intermediate plate 24. The motor 32 receives current through a conductor, not shown, controlled by a switch 35 mounted in the front wall 17 of the casing 10. The motor 32 is preferably arranged so that its shaft 36 is horizontal and extends parallel to the side walls of the casing 10. The motor 32 is provided with a casing 37 which includes an extension 38 at the rear end thereof in which is mounted a suitable reducing gear, not shown. The reducing gear transmits power to a horizontally arranged crank shaft 39 which extends at right angles to the motor shaft 36, the crank shaft 39 being centrally journalled in the extension 38. Crank shaft 39 is provided with cranks 40 and 41, respectively, on either side of the motor casing extension 38. Connecting rods 42 are pivotally connected to each of the cranks 40 and 41 and extend upwardly through apertures 43 in the casting 28, their upper ends being pivotally connected beneath the work table 29 to a cross arm 44 fixed to the lower end of the vertically reciprocating sleeve 16 which carries the capping head 15. The sleeve 16 is slidably mounted upon the upper portion of a vertically extending post 45 rigidly secured in a socket 46 in the casting 28. The post 45 may be secured in the socket 46 by a transverse pin 47 and extends up through a collared aperture 48 in the rear portion of the stationary work table 29. Vertically extending keys 49 are provided upon the post 45 to guide the movement of the sleeve 16 thereon.

Figure 5:
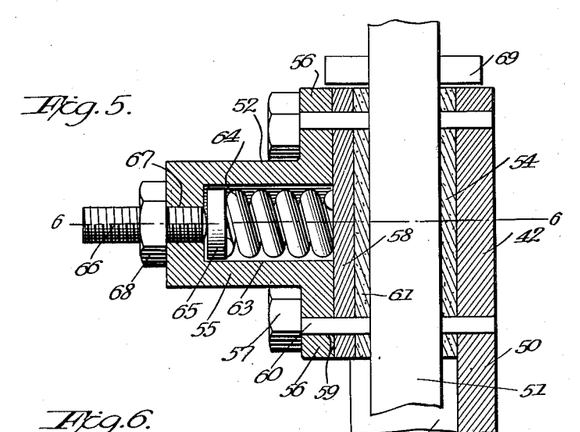
Figure 5 is a detailed vertical sectional view through the release mechanism taken on the line 5—5 of Figure 1.
Figures 6, 7:
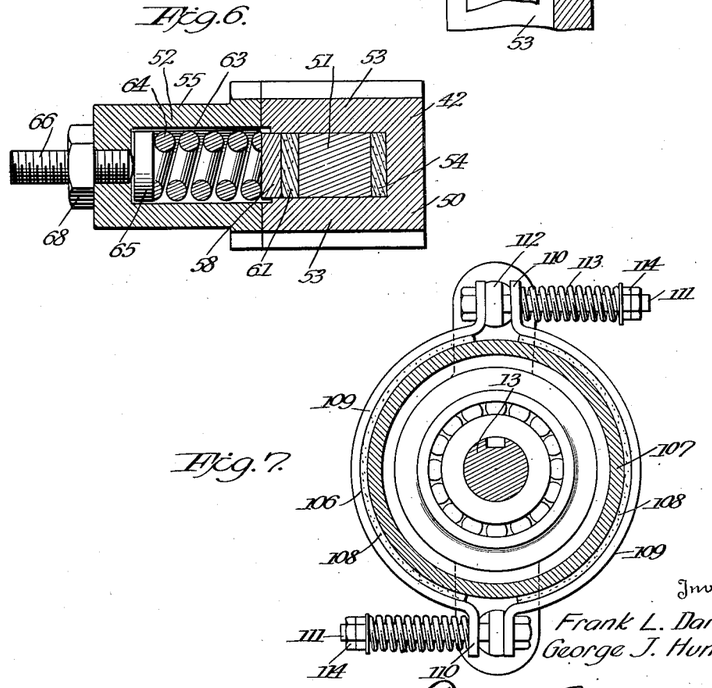
Figure 6 is a horizontal sectional view taken on the line 6—6 of Figure 5.
Figure 7 is a detailed horizontal sectional view taken on the line 7—7 of Figure 1.

Each of the connecting rods 42 is formed in two parts consisting of a lower member 50 and an upper member 51 which are normally held rigidly connected by a clutch element 52 mounted upon the lower member 50. The lower member 50 is U-shaped in cross-section and includes spaced laterally projecting flanges 53 and, as is best shown in Figures 5 and 6, a strip of friction material 54 is secured upon the inner face of the lower member 50 between these flanges. The upper member 51 of the connecting rod extends between the flanges 53 and one side thereof is in contact with the friction material 54. A spring housing 55 having upwardly and downwardly projecting flanges 56 is secured upon the outer ends of the flanges 53 of each of the lower members 50 of the connecting rods by bolts 57. The housing 55 supports a plate 58 upon its inner end within the flanges 53 of the member 50, plate 58 being provided at its upper and lower ends with apertures 59 through which extend pins 60 fixed in the flanges 56 of the spring housing 55, the plate being slidable upon the pins 60. A strip of anti-friction material 61 is supported on the inner surface of the plate 58, the pins 60 extending through the plate and into the material 61 to support the same between the plate and the outer surface of the upper member 51 of the connecting rod 42. The housing 55 is provided with a central bore 63 behind the plate 58 in which is mounted a coil spring 64. The inner end of the coil spring 64 bears against the plate 58 and its outer end bears against a block 65. An adjusting screw 66 threaded in a bore 67 in the outer end of the spring housing 55 is provided to permit the tension of the spring 64 to be adjusted. A lock nut 68 is provided upon the adjusting screw 66 to hold it in adjusted position.

Figure 1:
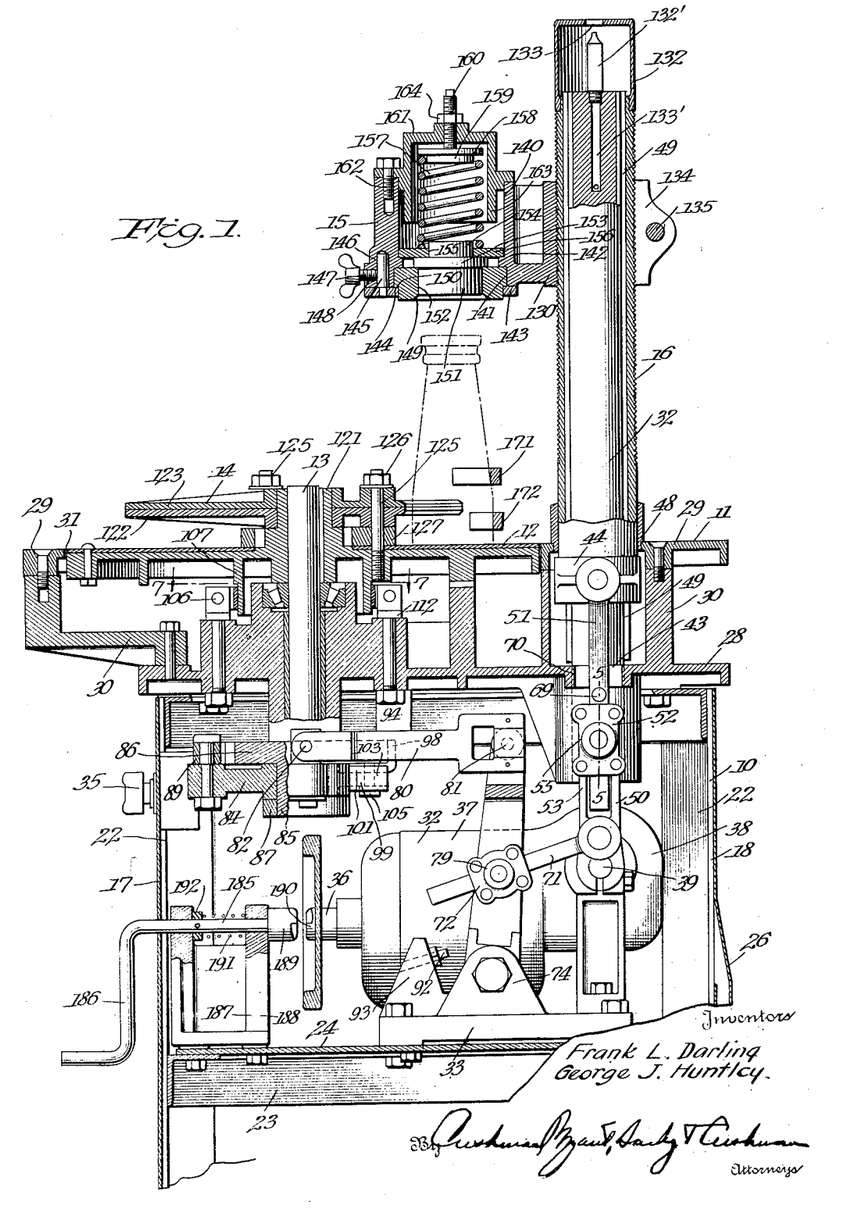
Figure 1 is a longitudinal vertical sectional view through the machine, the lower portion of the machine being broken away.

The spring 64 is adapted to be adjusted to exert sufficient pressure against the upper member 51 of the connecting rod 42 to hold it rigid with the lower member 50 in the normal operation of the machine, but to permit the member 50 to slide with respect to the member 51 upon the occurrence of an overload in the capping head. With the upper and lower members 50 and 51 of the connecting rods 42 in their normal position with respect to each other as shown in Figure 1, when the connecting rods 42 reach the upward limit of their stroke, stop pins 69 extending through the upper members 51 just above the clutch 52 will lightly contact against downwardly projecting flanges 70 about the apertures 48 in the casting 28 through which the connecting rods 42 extend.

Figure 8:
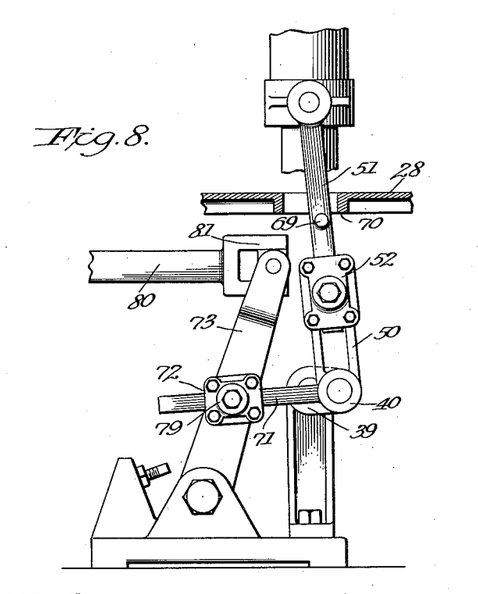
Figure 8 is a detail side elevation of the driving connections used with the machine, the driving connection to the capping head being shown in inoperative or released position.

The operation of the clutch or overload release elements 52 between the upper and lower members 51 and 50, respectively, of the connecting rods 42 is as follows: Whenever a receptacle is improperly positioned beneath the capping head 15 so that the latter may not move down about the mouth of the receptacle to properly perform the capping operation or, in other words, when the downward movement of the capping head is prevented, the clutches 52 will slip and will permit the lower members 50 of the connecting rods 42 to move downwardly along the upper members 51, as shown in Figure 8, the upper members 51 remaining stationary and thus preventing the receptacle from being crushed or broken. The rotation of the crank shaft 39 will continue in the usual manner and upon the next up-stroke of the cranks 40 and 41, the clutches 52 will slide upwardly along the upper members 51 of the connecting rods, since upward movement of the latter is prevented by reason of the engagement of stop pins 69 against the downwardly projecting flanges 70 fixed to the casting 28. The lower members 50 will move upwardly along the upper members 51 until the cranks have made their full upward stroke to position the clutches 52 adjacent the underside of the stop pins 69. So long as the overload condition continues the clutches 52 will alternately slip and return to normal position so that the motor and crank shaft may be operated independently of the capping head without causing any damage to the receptacle. However, if the receptacle is moved entirely out of the path of the capping head as would occur in the normal operation of the receptacle feeding table 12, as hereinafter described, and if the next receptacle presented to the capping head is properly aligned therewith, the upper and lower members 51 and 50, respectively, of the connecting rods 42, will remain in the normal relative position shown in Figure 1 and obtained by the up-stroke of the crank shaft 39 and the machine will continue its operation in a normal manner.

Means to impart a step by step rotation to the movable platform or feeding means 12 is also operated from the crank shaft 39. A crank rod 71 is pivotally connected to the extreme end of either of the cranks 40 and 41 of the crank shaft 39, according to the direction in which it is desired to have the feeding platform 12 move. In the embodiment of the invention shown in the drawings, the feeding platform is operated to turn in a counter-clockwise direction and the crank rod 71 is therefore connected to the right hand crank 40 of the crank shaft. Rod 71 extends into a clutch 72 pivotally secured to a lever 73 which is journaled for oscillation in a lug 74 which projects upwardly from the base casting 33. The clutch 72 includes a U-shaped member 75 having a pin 76 formed integrally therewith journaled in a transverse bore intermediate the length of the lever 73. A friction strip 77 is positioned between the arms or flanges 78 of the U-shaped member 75 and the crank rod 71 projects between flanges 78 and in contact with the friction strip. A spring housing 79 identical in construction with the spring housings 55 of the clutches 52 is secured to the outer ends of the flanges 78 and holds a second friction strip 77 against the outer surface of the crank rod 71.

The upper end of the lever 73 is connected to a horizontally extending link 80 by means of a universal connection 81 and the outer end of link 80 is connected by a universal connection 82 to an arm 83 extending radially from a pawl disc 84 mounted for rotation upon the downwardly extending central collar or hub 85 of a ratchet disc 86 keyed to the lower end of the shaft 13 which carries the rotatable receptacle feeding platform 12. A ring 87 is secured to the collar 85 beneath the pawl disc 84 to hold the latter upon the collar. A second arm 88 projects radially from the pawl disc 84 and carries a pivotally mounted pawl 89 at the outer end thereof, which pawl is held in contact with the periphery of the ratchet disc 86 by a spring 90 having one end connected to the pawl and having its other end secured to the pawl disc.

Figure 4:
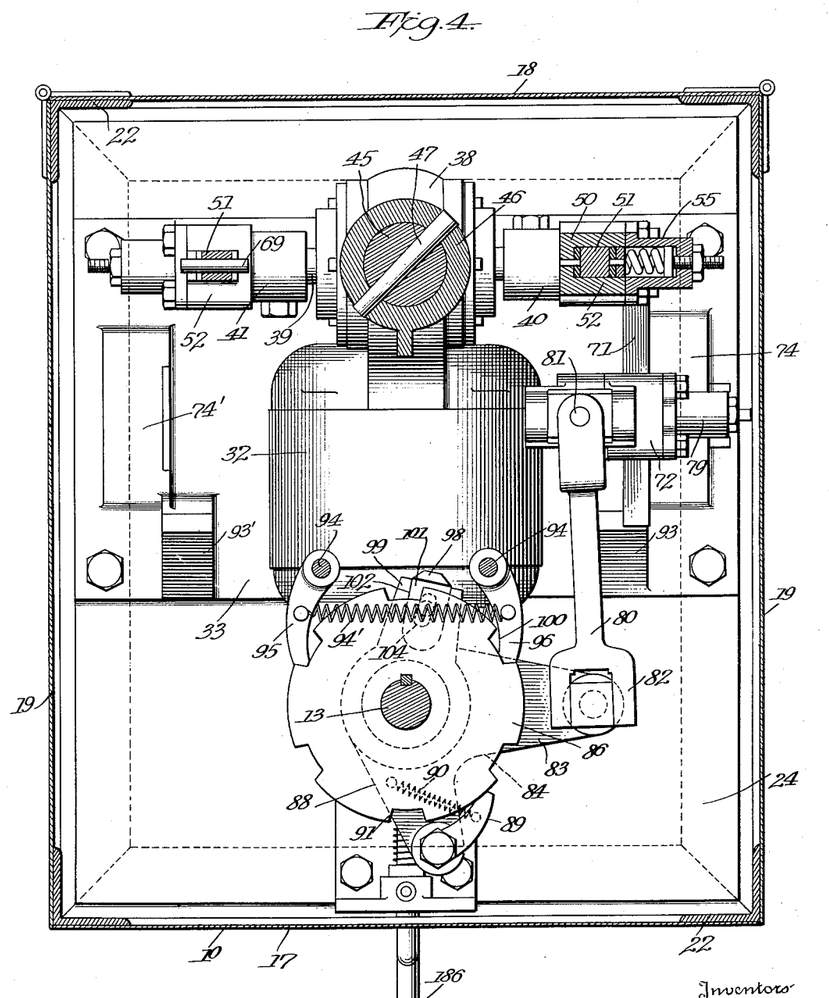
Figure 4 is a horizontal sectional view showing the operating mechanism of the machine.

By the above arrangement, forward movement of the link 80 will turn the pawl disc 84 in a clockwise direction from the position shown in Figure 4 to cause the pawl 89 to move rearwardly and engage one of the notches 91 of the ratchet disc 86. The return movement of the link 80 will cause the ratchet disc 86 and the receptacle feeding platform 12 to turn in a counterclockwise or receptacle feeding direction.

Figure 9:
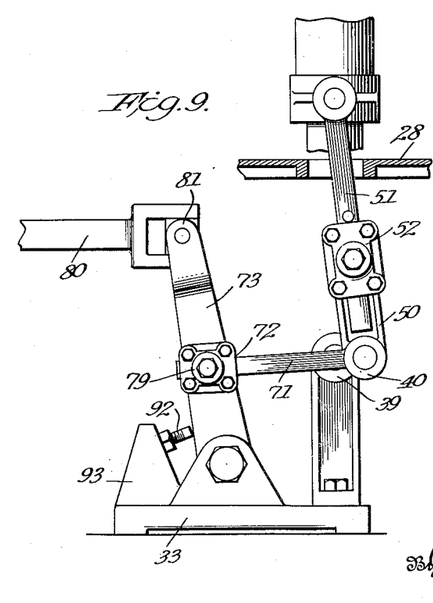
Figure 9 is a detail side elevation similar to Figure 8, but with the driving connection to the receptacle feeding mechanism shown in inoperative or released position.

The operation of the clutch or overload release element 72 between the crank rod 71 and lever 73 is as follows:—Whenever a receptacle is improperly positioned with respect to the spider 14 or if the spider and receptacle feeding platform 12 are held against rotation for any reason and the link 80 cannot be drawn backwardly to cause the feeding table 12 and spider 14 to rotate in a feeding direction, the clutch 72 will permit the crank rod 71 to move outwardly therefrom, the lever 73 remaining stationary. The rotation of the crank shaft 39 will continue and on the next forward movement of the crank rod 71, the lever 73 will be moved forwardly to the extreme forward limit of its movement (as shown in Figure 9), when it will contact with a set screw 92 threaded in an abutment 93 integral with the base casting 33. Since further forward movement of the lever 73 is thus prevented, the crank rod 71, continuing its forward stroke, will move through the clutch 72 until the crank rod 71 and lever 73 are restored to their normal position with respect to each other. If the overload condition at the receptacle feeding platform or spider continues, the crank rod 71 will again slip back through the clutch 72 and so long as the overload condition remains, the crank rod 71 will alternately slip and return to its normal position with respect to the lever 73. However, when the overload condition is corrected, the crank rod 71 will operate the lever 73 to actuate the feeding mechanism in a normal manner.

The set screw 92 may be adjusted with respect to the abutment 93 and held in adjusted position by means of a lock nut, as shown.

Two pawls 95 and 96 are pivotally mounted upon posts 94 extending downwardly from the underside of the casting 28 in position to engage the ratchet disc 86. The pawls 95 and 96 are disposed upon opposite sides of the ratchet disc 86 and face in opposite directions so that when they are in engagement with the notches 91 spaced about the ratchet disc, the latter will be held against movement. A spring 94' having its ends fixed to the respective pawls 95 and 96 holds the pawls against the ratchet disc 86. A cam 98 is mounted at the end of an arm 99 projecting radially from the pawl disc 84 at such an angle that when the machine is arranged for driving the movable platform 12 in a counter-clockwise direction, the cam 98 will, at the end of the forward stroke of link 80, engage the inner surface 100 of the right hand pawl 96 (Figure 4), moving the pawl 96 out of engagement with the ratchet disc 86. Ratchet disc 86 will then be free to rotate in a counter-clockwise direction upon the return or driving movement of the link 80 and pawl disc 84 since the left hand pawl 95 will merely ride over the notches 91 of the ratchet disc. The rotation of pawl disc 84 in a counter-clockwise direction will move cam 98 out of engagement with pawl 96 and it will be free to move into engagement with the next notch 91 of the ratchet disc.

The cam 98 is adjustably mounted in the arm 99 in that it includes a horizontally projecting arm 101 which extends into a radial groove 102 in the arm 99. The lower wall 103 of the groove 102 is slotted at 104 and a bolt 105 extends through the slot 104 and is threaded into the arm 101 of the cam. The cam is locked in position with respect to the arm 99 by the engagement of the head of the bolt 105 with the under surface of the arm 99.

Figure 3:
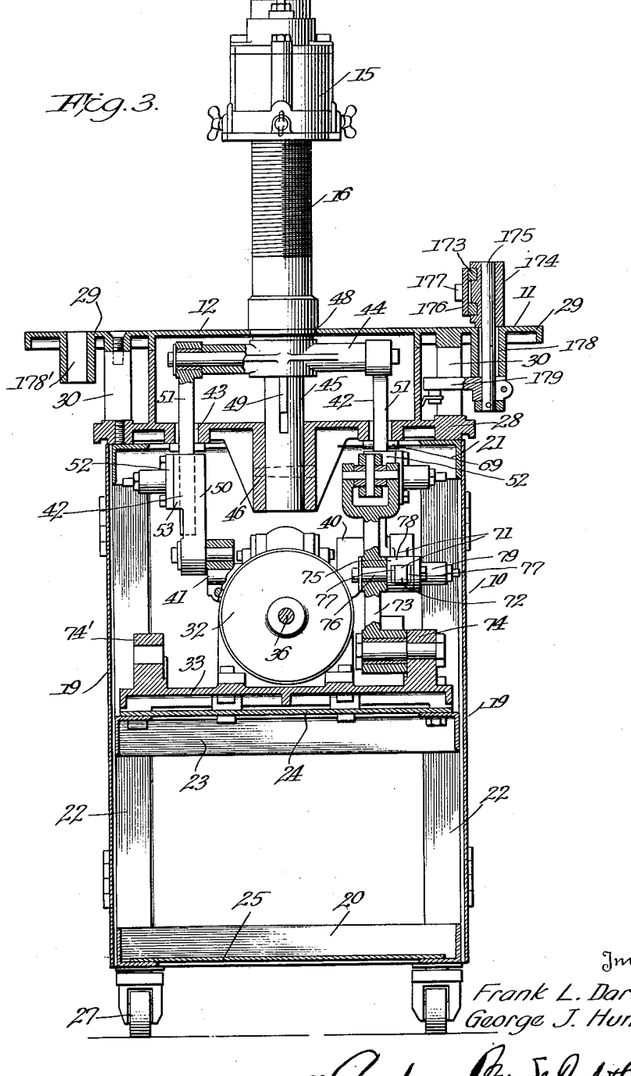
Figure 3 is a transverse vertical sectional view of the machine.

If it is desired to move the feeding platform 12 in a clockwise direction, the crank rod 71 is connected to the left hand crank 41 of the crank shaft 39 and the lever 73 is mounted in a journaled lug 74' mounted on the left hand side (Figure 3) of the casting 33 in a position corresponding to that of the right hand journal lug 74. During the clockwise movement, an abutment 93' adjacent lug 74' will serve the purpose which abutment 93 serves during counter-clockwise movement. The pawl disc 84 will also be reversed so that the radially projecting arm 83 thereof may be connected to the outer end of the link 80. Reversal of the pawl disc 83 will cause the cam 98 to release the left hand pawl 95 from engagement with the ratchet disc 86, the left hand pawl 95 being the pawl which would otherwise prevent clockwise feeding movement of the ratchet disc 86. It is obvious that in a machine arranged in this manner, the pawl 96 will prevent return or counterclockwise movement of the ratchet disc 86 but will merely ride over the notches 91 in the latter during clockwise rotation.

The pawls 95 and 96 will prevent the ratchet disc and hence the moving platform 12 carrying the receptacles from turning in a reverse direction and will likewise, in the arrangement of the machine shown, tend to prevent too great a movement of the work table 12 in a counterclockwise direction. However, in order to insure that the work table 12 will be stopped immediately the pawl disc 84 has completed its driving movement, a brake device 106, best shown in Figure 7, is provided upon the upper surface of the casting 28 and in engagement with a brake drum 107 formed integrally upon the lower side of the moving platform 12 and concentric with the shaft 13. The brake device 106 preferably comprises two semicircular friction bands 108 in engagement with the outer surface of the brake drum 107 and carried by metal straps 109. The ends of the straps 109 are provided with apertured ears 110. Bolts 111 extend through the apertured ears 110 and through posts 112 extending upwardly from the casting 28, the ears being positioned on either side of the posts. Springs 113 encircle the bolts 111, one end of the springs exerting pressure upon the adjacent ear 110, while the other end of the spring bears upon lock nuts 114 on the outer end of the bolt 111. The friction bands 108 are thereby held pressed against the brake drum 107, and prevent overrunning of the shaft 13 and feeding platform 12.

The receptacle moving spider 14 is mounted upon a collar 121 which projects upwardly from the table 12 above the shaft 13. The spider 14 is preferably formed of a lower spider member 122, and an upper spider member 123. The two spider members are provided with a plurality of arcuate slots 124 through which extend bolts 125 fixed in the feeding platform 12. Nuts 126 are threaded on the upper ends of the bolts 125. The bolts 125 also extend through an apertured ring 127 mounted on the work table 12 and having its upper surface in contact with the lower surface of the lower spider member 122. The spider members 122 and 123 together form circumferentially spaced notches 128 to accommodate receptacles of a particular size. It is obvious that by loosening the nuts 126 and turning the spider members 122 and 123 with respect to each other upon the collar 121, the size of the notches 128 may be varied.

The capping head 15 is mounted for vertical adjustment with respect to its supporting sleeve 16, the sleeve being screw threaded throughout the greater portion of its length and the supporting arm 130 of the capping hand being provided with a screw threaded bore which engages the threads on the sleeve 16. Rotation of the capping head 15 about the sleeve 16 will cause the capping head to be moved upwardly or downwardly with respect to the sleeve to vary its vertical position with respect to the table 11 and feeding platform 12 and will thereby permit receptacles of various heights to be capped by the capping head. The upper end of the sleeve 16 has a cap 132 threaded thereon, the cap 132 being sufficiently high to prevent it from striking the upper end of the fixed post 32 when the sleeve 16 is moved downwardly. The cap 132 is provided with a central aperture 133 to permit clearance therethrough of an upwardly projecting lubricating fixture 132' on the upper end of the post 32. Lubricating passages 133' lead from fixture 132' to permit lubrication of the keys or slideways 49. The supporting arm 130 of the capping head is split as shown at 134 and a clamping bolt 135 is provided so that it may be clamped in adjusted position on the sleeve 16.

The capping head 15 is particularly designed to permit it to be used with cap blanks having a wide size range and is provided with a vertically extending bore 140 having an enlarged lower portion 141 and a shoulder 142 above the enlarged portion. A ring 143 is fitted at the lower end of the enlarged bore 141 and upon the underside of the capping head 15, the inner edge of the ring extending past the lower edge of the bore to provide a shoulder 144. The ring 143 is provided on its upper surface with upwardly projecting circumferentially spaced pins 145 which extend into correspondingly spaced sockets 146 in the lower face of the head 15 and about the bore 141. Horizontally arranged set screws 147 are threaded into apertures 148 extending from the outer face of the head 15 to the sockets 146, these set screws being adapted to engage the pins 145 to lock the ring 143 in position. A throat member 149 is supported in the enlarged lower bore 141 of the capping head, the throat member being provided with an external annular shoulder 150 which rests upon the shoulder 144 of the ring 143. The upper surface of the throat member 149 contacts with the lower surface of the capping head flange 142 and is thus held against upward movement. A presser foot 151 is fitted within the bore 152 of the throat member and is provided with a flange 153 adjacent its upper end which rests upon the upper surface of the throat member. A boss 154 on the upper surface of the presser foot extends through an aperture 155 in a guide plate 156 which is slidable in the bore 140 and rests upon the upper surface of the flange 142. The flange 153 on the presser foot 151 and the flange 142 of the capping head are of the same height so that the plate 156 may normally bear upon the upper surface of both flanges. A relatively strong coil spring 157 is positioned in the bore 140 with its lower end surrounding the upper portion of the boss 154 of the presser foot and bearing downwardly upon the plate 156. The upper end of the spring 157 bears against a disc 158 having a central downwardly projecting portion 159 which latter extends within the coils of the spring to center the same upon the disc 158.

Disc 158 is provided with a central socket in its upper surface in which seats the lower end of a set screw 160 threaded in the cover 161 of the capping head. The cover 161 of the capping head is secured to the body of the head by bolts 162 as shown and includes a downwardly projecting annular flange 163 provided for the purpose of limiting the upward movement of the plate 156. The tension of the spring 157 may be adjusted by means of the set screw 160, a lock nut 164 provided on the set screw serving to hold the latter in adjusted position.

To adjust the capping head 15 to operate with caps of various sizes, it is only necessary to position in the capping head a throat member 149 and a presser foot 151 of proper size for the cap to be handled. By releasing the ring 143 from the capping head, the presser foot and throat member may both be changed, the plate 156 preventing the spring 157 from falling from the capping head. Since the spring 157 bears on this plate instead of directly on the presser foot, it will exert no resistance against the insertion of a presser foot.

A guide member 170 is mounted on the stationary work table 11 and extends out over the feeding platform 12 to coact with the spider 14 to guide the receptacles in their movement toward the capping head 15. The particular function of the guide 170 is that of holding the receptacles pressed inwardly against the inner surface of the notches 128 of the spider so that they will be in exact alignment with the throat and presser foot of the capping head. The guide 170 comprises two vertically spaced arcuate bars 171 and 172, each provided on their rear surfaces and near their outer end with projecting arms 173. The arms 173 are clamped upon a collar 174 pinned to a stub shaft 175, the clamping being effected by a vertically extending clamp 176 which is held against the arms 173 by bolts 177 threaded into the collar 174. The stub shaft 175 is journaled in an aperture 178 of the stationary work table 11 and is provided at its lower end, beneath the work table 11, with an arm 179. One end of a spring 180 is secured to the outer end of the arm 179, the other end of the spring being secured to the casting 28. Since the guiding members 171 and 172 are relatively movable with respect to each other and are separately controlled by the clamping member 176, the horizontal positioning of the guiding members with respect to the spider 14 may be varied. For example, if the machine is to be used for capping receptacles having walls which are inwardly tapered toward the upper end of the receptacle as shown in Figure 1, the upper guiding member 171 may be moved inwardly toward the spider 14 to bear against the reduced upper portion of the receptacle.

When the machine is being operated to move the receptacles in a clockwise direction, instead of counter-clockwise as shown, the guide member 170 may be mounted in an aperture 178' at the left hand side of the work table 11.

In order that the machine may be operated to some extent by hand to move the operating parts without operation of the motor 32, a shaft 185, having a hand crank 186 at its outer end, is provided which extends through the front wall 17 of the casing 10 and is journaled in a U-shaped bracket 187 having horizontally extending bores at the outer ends of the legs 188 thereof. The inner end of the shaft 185 is provided with a notched head 189 which may be moved inwardly to engage the notched end 190 of the shaft 36 of the motor. A coil spring 191 is provided about the shaft 185 between the legs of the U-shaped bracket, the inner end of the spring bearing against the inner surface of the inner leg 188 while the opposite end of the spring bears against a collar 192 fixed to the shaft 185.

In the operation of our machine, when the machine is being operated to rotate the feeding platform 12 and spider 14 in a counter-clockwise direction, the attendant will move receptacles with cap blanks on their mouths from the stationary work table 11 or from any other adjacent point into the adjacent notch of the spider 14 at the point A (Figure 2). The step by step rotation of the receptacle feeding platform 12 and the spider 14 will move the receptacle until it is in vertical alignment with the capping head 15. The guiding member 170 will maintain the receptacles in the notches 128 of the spider 14 during this movement and when the receptacle is beneath the capping head 15, the guide member 170 will press the receptacle inwardly against the notch 128 of the spider so that the mouth of the receptacle will be exactly in vertical alignment with the throat 149 and presser foot 151 of the capping head. The pawls 95 and 96 acting upon the ratchet disc 86 and the brake device 106 acting upon the brake drum 107 will prevent all possibility of the spider and receptacle feeding platform moving a receptacle past the point at which it will be properly engaged by the capping head. The mechanism of the machine is so arranged that when the receptacle feeding platform has stopped, the capping head 15 will move downwardly and the throat 149 of the capping head will pass down about the cap blank positioned upon the mouth of the bottle and will clamp this about the sides of the mouth of the bottle, the mouth of the bottle forcing the presser foot 151 upwardly against the action of the coil spring 157. The capping head 15 will then move upwardly to clear the receptacle and the spider 14 and receptacle feeding platform 12 will be turned to present another receptacle beneath the capping head. When the capping head moves upwardly the presser foot 151 will be forced back down into the throat 149 by the spring 157.

In case a receptacle should be improperly presented upon the feeding platform by the attendant or if the receptacles should hinder the movement of the spider 14 and feeding platform 12 for any reason, resulting in an overload upon the driving mechanism, the clutch 72 will permit the crank rod 71 of the receptacle feeding platform mechanism to slip when the crank rod 71 moves to make its next actuating movement of the feeding table and spider. So long as the overload condition continues, the crank shaft 39 and motor 32 will operate independently of the feeding mechanism but immediately the overload condition is corrected, the crank rod 71 will be reset to proper relation with the lever 73 and the feeding mechanism will function in its normal manner.

If a receptacle is presented beneath the capping head in such a manner that the capping head cannot pass down about the mouth of the receptacle but because of misalignment strikes the upper edge of the mouth of the receptacle resulting in an overload, the clutch 52 will permit the lower members 50 of the connecting rods 42 to slip when the connecting rod moves downwardly to operate the capping head. As long as the overload condition continues, the crank shaft 39 and motor 32 will operate independently of the capping mechanism, but immediately the overload condition is corrected, the lower members 50 of the connecting rods 42 will be reset to proper relation with the upper members 51 and the capping mechanism will function in its normal manner.

The spider 14 may be adjusted to handle receptacles of a wide range of sizes and configurations by varying the position of the upper and lower spider members 123 and 122, respectively, with respect to each other to vary the size of the notches 128 of the spider and to align the receptacles with the capping head.

Ordinarily, the capping head will extend from the sleeve to directly toward the shaft 13 or axis of the spider, as shown in Figure 2, and the vertical axis of the presser foot 151 will be at the point X marking the intersection of the center line CL (passing through the axes of the capping head sleeve 16 and spider shaft 13) and the circle C concentric with the axis of spider shaft 13. In handling receptacles of the smaller sizes and of average sizes, the spider members 122 and 123 may be adjusted with respect to each other so that the axis of the receptacles will be on the circle C. It will be noted from Figure 2 that the receptacle R diagrammatically shown thereon has its axis on this line and its axis will therefore correspond to the point X when a receptacle of this size is presented beneath the capping head. On Figure 2, there is also illustrated, in dotted lines, a smaller receptacle R', which is positioned with its axis X' on the circular line C by adjustment of the spider members 122 and 123 to the dotted line positions 122' and 123'.

When receptacles of a greater diameter than that of the receptacle R are to be operated upon by the machine, it will not be possible to increase the size of the notches 128 of the spider to so position such receptacles that their vertical axis will be on the circular line C but such receptacles may be aligned with the capping head presser foot by the following procedure:—The capping head 15 is released from locked engagement with the sleeve 16 by loosening the clamping bolt 135 and the spider members 122 and 123 are released from locked engagement with respect to the shaft 13 and feeding platform 12 by loosening the nuts 126. The receptacle is then positioned in the notch 128 which is adjacent the capping head so that its axis will be on the line CL. The capping head is then preferably swung to the left (if the receptacles are being fed counterclockwise) and the spider is turned by hand with respect to the shaft 13 and feeding platform until the axis of the receptacle R'' and the axis of the presser foot corresponds at the point X'' on the larger circle C'. The capping head is then locked to the sleeve 16 and the spider members 122 and 123 are locked with respect to the shaft 13 and the machine may be operated in the usual manner. Since both the capping head and the spider have been moved, the timing of the machine will not be affected.

When receptacles of a size even greater than that of the receptacle R'' are to be capped, a spider having but three notches instead of the six notches shown, may be used. With such a spider, containers of one gallon size can be capped with the present machine. In handling these larger receptacles, the spider 14 will present but three receptacles to the capping head upon each complete rotation of the shaft 13, but the capping head will reciprocate six times. However, the alternate movements of the capping head will occur at a time when no receptacle is positioned beneath it and the timing of the machine need not be disturbed.

The guiding element 170 may, of course, be adjusted for receptacles of all sizes.

It will be understood that the present machine may, if desired, be operated in connection with various conveyor mechanisms for feeding receptacles to the machine or to the attendant or with conveyors either for removing the capped receptacles directly from the feeding platform or which will convey capped receptacles to another point in the plant when they are placed thereon by the attendant.

We claim:—

1. In a machine for capping receptacles, a capping head, a vertical member, said capping head being vertically reciprocable upon said member, feeding means to move receptacles beneath said capping head, said feeding means having a rotary path of travel, said capping head being mounted for laterally swinging adjustment with respect to said member to vary its position with respect to the rotary path of travel of said feeding means.

2. In a machine for capping receptacles, a vertical member, an element vertically reciprocable upon said member, a capping head carried by said element, a vertical rotatable shaft, receptacle feeding means carried by said shaft, said feeding means being circumferentially movable with respect to said shaft and said capping head being circumferentially movable with respect to said element to vary the point at which the receptacles are presented to said capping head.

3. In a machine for capping receptacles, a support, a capping head, a movable member for feeding receptacles to said capping head, a plurality of guiding members vertically spaced with respect to each other carried by said support and coacting with said receptacle holding means to align receptacles with said capping head, said guiding members being adjustable with respect to each other to accommodate receptacles of different configurations.

4. A capping head comprising a throat member, removable means to support said throat member in the capping head, the capping head having an inwardly projecting flange to hold said throat member against upward movement, a presser foot within said throat member, said presser foot having a flange thereon to support it upon and within said throat member, a slidable plate bearing upon the flange on said presser foot and the flange on the capping head and a spring to normally hold said plate upon the flanges and thereby normally hold said presser foot within said throat member.

5. In a machine for capping receptacles, a capping head, a vertical member, feeding means to move receptacles to said capping head, said feeding means having a rotary path of travel, said capping head being mounted for laterally swinging adjustment with respect to said member to vary its position with respect to the rotary path of travel of said feeding means.

6. In a machine for capping receptacles, a vertical member, a capping head carried by said member, a vertical rotatable shaft, receptacle feeding means carried by said shaft, said feeding means being circumferentially movable with respect to said shaft and said capping head being circumferentially movable with respect to said member to vary the point at which the receptacles are presented to said capping head.

7. In an apparatus of the class described, the combination, of means for feeding receptacles, driving means, a driving connection between said driving means and feeding means including two parts arranged to move relatively to each other upon the occurrence of an overload, and means in the path of movement of said driving connection to restore said parts to normal relative position.

8. In an apparatus of the class described, the combination, of means for feeding receptacles, driving means, a driving connection between said driving means and feeding means including two parts arranged to move relatively to each other upon the occurrence of an overload, and stationary means to limit the movement of one of said parts to restore said parts to normal relative position.

9. In an apparatus of the class described, the combination, of means for feeding receptacles, driving means, a two-part driving connection between said driving means and feeding means, said driving connection including means to permit the parts thereof to move relatively to each other so that said driving means may operate independently of said feeding means upon the occurrence of an overload at said feeding means, and stationary means to limit the movement of one of the parts of said driving connection to restore the latter to normal relative position.

10. In an apparatus of the class described, the combination, of means for feeding receptacles, actuating means, an operating connection between said actuating means and feeding means having two-directional movement and adapted, when moving in one direction, to move said feeding means in receptacle feeding movement, said operating connection comprising a driving member and a driven member, said driving member being arranged to move with respect to said driven member during movement in the receptacle feeding direction upon the occurrence of an overload, and means to limit the movement of said driven member in the opposite direction to permit said driving member to move with respect thereto and be restored to normal position.

11. In an apparatus for the class described, the combination, of means for capping receptacles, driving means, a driving connection between said driving means and capping means including two parts arranged to move relatively to each other upon the occurrence of an overload, and stationary means in the path of movement of said driving connection to restore said parts to normal relative position.

12. In an apparatus of the class described, the combination, of means for capping receptacles, driving means, a driving connection between said driving means and capping means including two parts arranged to move relatively to each other upon the occurrence of an overload, and stationary means to limit the movement of one of said parts to restore said parts to normal relative position.

13. In an apparatus of the class described, the combination, of means for capping receptacles, driving means, a two-part driving connection between said driving means and capping means, said driving connection including means to permit the parts thereof to move relatively to each other so that said driving means may operate independently of said capping means upon the occurrence of an overload at said capping means, and stationary means to limit the movement of one of the parts of said driving connection to restore the latter to normal relative position.

14. In an apparatus of the class described, the combination, of means for capping receptacles, actuating means, an operating connection between said actuating means and capping means having two-directional movement and adapted, when moving in one direction, to move said capping means in receptacle capping movement, said operating connection comprising a driving member and a driven member, said driving member being arranged to move with respect to said driven member during movement in the receptacle capping direction upon the occurrence of an overload, and means to limit the movement of said driven member in the opposite direction to permit said driving member to move with respect thereto and be restored to normal position.

15. In an apparatus of the class described, the combination, of means for feeding receptacles, driving means, a driving connection between said driving means and feeding means including two frictionally connected parts adapted to slip with respect to each other upon the occurrence of an overload and means in the path of movement of said driving connection to restore said parts to normal relative position.

16. In an apparatus of the class described, the combination, of means for feeding receptacles, driving means, a driving connection between said driving means and feeding means including two parts arranged to slip relatively to each other upon the occurrence of an overload, and stationary means to limit the movement of one of said parts to restore said parts to normal relative position.

17. In an apparatus of the class described, the combination, of means for feeding receptacles, driving means, a two-part frictional driving connection between said driving means and feeding means, said parts of the driving connection being adapted to slip relatively to each other so that said driving means may operate independently of said feeding means upon the occurrence of an overload at said feeding means, and stationary means to limit the movement of one of the parts of said driving connection to restore the latter to normal relative position.

18. In an apparatus of the class described, the combination, of means for feeding receptacles, actuating means, an operating connection between said actuating means and feeding means having two directional movement and adapted, when moving in one direction, to move said feeding means in receptacle feeding movement, said operating connection comprising frictionally engaged driving and driven members, said driving means being arranged to slip with respect to said driven member during movement in the receptacle feeding direction upon the occurrence of an overload, and means to limit the movement of said driven member in the opposite direction to permit said driving member to move with respect thereto and be restored to normal position.

19. In an apparatus of the class described, the combination, of means for capping receptacles, driving means, a driving connection between said driving means and capping means including two frictionally connected parts adapted to slip with respect to each other upon the occurrence of an overload and stationary means in the path of movement of said driving connection to restore said parts to normal relative position.

20. In an apparatus of the class described, the combination of means for capping receptacles, driving means, a driving connection between said driving means and capping means including two parts arranged to slip relatively to each other upon the occurrence of an overload, and stationary means to limit the movement of one of said parts to restore said parts to normal relative position.

21. In an apparatus of the class described, the combination, of means for capping receptacles, driving means, a two-part frictional driving connection between said driving means and capping means, said parts of the driving connection being adapted to slip relatively to each other so that said driving means may operate independently of said capping means upon the occurrence of an over-load at said capping means, and stationary means to limit the movement of one of the parts of said driving connection to restore the latter to normal relative position.

22. In an apparatus of the class described, the combination, of means for capping receptacles, actuating means, an operating connection between said actuating means and capping means having two directional movement and adapted, when moving in one direction, to move said capping means in receptacle capping movement, said operating connection comprising frictionally engaged driving and driven members, said driving means being arranged to slip with respect to said driven member during movement in the receptacle capping direction upon the occurrence of an overload, and means to limit the movement of said driven member in the opposite direction to permit said driving member to move with respect thereto and be restored to normal position.

23. In a capping machine for receptacles, a capping head, a vertical member, said capping head being vertically reciprocable upon said member, rotary means for feeding receptacles in a horizontal path to said capping head, said capping head being laterally movable and said feeding means being circumferentially adjustable to vary the point at which receptacles will be presented to said capping head.

24. In a capping machine, a capping head, a vertically reciprocable member upon which said capping head is mounted, means to feed receptacles into alignment with said head in an arcuate path, said capping head being circumferentially movable with respect to said reciprocable member to operate upon receptacles at varying points in the path of travel of said feeding means.

25. In a capping machine, a capping head, a vertically reciprocable member upon which said capping head is mounted, means to feed receptacles into alignment with said head in an arcuate path, said capping head being laterally movable with respect to said reciprocable member to operate upon receptacles at varying points in the path of travel of said feeding means.

26. In a capping machine, a capping head, means to feed receptacles into alignment with said head in an arcuate path, a vertically reciprocable member upon which said capping head is mounted by a threaded connection so that the head may be adjusted vertically and circumferentially with respect to said reciprocable member.

27. In a capping machine for receptacles, a capping head, means for feeding receptacles in a horizontal path to said capping head, said feeding means comprising a feeding element and driving means therefor, said feeding element being carried upon said driving means, said capping head being laterally movable and said feeding element being bodily movable upon said driving means and thereby adjustable with respect to its path of travel to vary the point at which receptacles will be presented to said capping head.

28. In a capping machine for receptacles, a capping head, a vertical member, said capping head being vertically reciprocable upon said member, means for feeding receptacles in a horizontal path to said capping head, said feeding means comprising a feeding element and driving means therefor, said feeding element being carried upon said driving means, said capping head being laterally movable and said feeding element being bodily movable upon said driving means and thereby adjustable with respect to its path of travel to vary the point at which receptacles will be presented to said capping head.

FRANK L. DARLING.
GEORGE J. HUNTLEY.